Patented Mar. 2, 1943

2,312,362

UNITED STATES PATENT OFFICE 2,312,362

METHOD OF TACKIFYING SYNTHETIC RUBBER

Donald V. Sarbach, Cuyahoga Falls, Ohio, assignor to The B. F. Goodrich Company, New York, N. Y., a corporation of New York No Drawing. Application August 26, 1941, Serial No. 408,350

4 Claims. (Cl. 260—36)

This invention relates to a method of tackifying synthetic rubber and to a liquid which may be applied to synthetic rubber surfaces to produce excellent tack thereon.

One of the outstanding characteristics of natural rubber is its tack, by which is meant the property of adhering to itself. Two pieces of natural crude rubber which do not feel sticky or adhere well to other materials may be so tightly adhered to each other by merely pressing them together that it is impossible to pull the pieces apart without tearing the rubber. Certain synthetic rubbers such as copolymers of butadiene and acrylonitrile are deficient in this valuable property. One of the greatest difficulties encountered in the use of such synthetic rubbers to manufacture tires, tubing and similar articles where several plies of rubber are superposed has been the inability to obtain good adhesion between adjacent layers of synthetic rubber.

It is an object of this invention to provide a method whereby the surface of non-tacky synthetic rubber may be rendered tacky. It is a further object of this invention to provide tackifying solutions which may be applied to the surface of synthetic rubber. Further objects will appear from the following description of the invention.

I have discovered that unvulcanized synthetic rubber surfaces may be rendered tacky by applying thereto a solution of a substituted naphthalene hydrocarbon containing at least one benzyl radical attached to a nuclear carbon atom in the naphthalene ring and at least one alkyl radical containing not more than six carbon atoms also attached to a nuclear carbon atom in the naphthalene ring. The alkyl radical contained in such hydrocarbons may be a methyl, ethyl, n-propyl, isopropyl, n-butyl, isobutyl, n-amyl, active amyl, isoamyl, hexyl or other alkyl radical containing not more than six carbon atoms. Specific examples of tackifying solutions which may be employed in this invention include such benzyl-alkyl-substituted naphthalenes as 1-methyl 2-benzyl naphthalene, 1-methyl 4-benzyl naphthalene, 1-ethyl 2 benzyl naphthalene, 1-n-propyl 4 benzyl naphthalene, 2-n-butyl 6-benzyl naphthalene, 1-n-amyl 4-benzyl naphthalene, 1-n-amyl 2-benzyl naphthalene, 2-isoamyl 6-benzyl naphthalene, 1-benzyl 2,6-dimethyl naphthalene, 1-benzyl 2,6-di-n-amyl naphthalene, 1,2-dibenzyl 6-amyl naphthalene, 1,4-di-benzyl 6-butyl naphthalene, 1,4-di-amyl 4,6-dibenzyl naphthalene and the like. Since it is easier and cheaper to prepare isomeric mixtures of most of these compounds than to produce them in pure form, solutions of such mixtures are usually used. The various amyl benzyl naphthalenes such as 1-amyl 4-benzyl naphthalene, 1-amyl 2-benzyl naphthalene and the like all form excellent tackifying solutions, hence it is preferred to employ a solution of a mixture of these.

To prepare the tackifying solution the alkylbenzyl naphthalene is dissolved in a volatile organic solvent in such proportion that the solution contains not more than about 30% by volume of the naphthalene hydrocarbon. The term "volatile organic solvent" is used to designate those organic compounds which are liquid at ordinary temperature and pressure (room temperature and 1 atmosphere pressure) and which will evaporate under such conditions. Such solvents will ordinarily possess a vapor pressure at 20° C. and 1 atmosphere pressure of at least 5 mm., and will have a boiling point at 1 atmosphere of less than about 150° C. The best volatile organic solvents for this purpose contain oxygen or halogen although other solvents in which the naphthalene hydrocarbon is soluble, especially volatile aromatic hydrocarbons such as toluene, may be employed. Examples of preferred solvents include acetone, methyl ethyl ketone, ethyl acetate, isopropyl acetate, chloroform, ethylene dichloride and isopropyl chloride. The solvent may also consist of a mixture of materials such as a mixture of equal volumes of acetone and isopropyl chloride.

The solution of the benzyl-alkyl naphthalene may be applied to the synthetic rubber surface by any desired method as by brushing or by dipping the rubber in the solvent. The penetration of the tackifier into the rubber may be aided by roughening the surface with a wire brush before or after the solution has been applied.

As a specific example the following solution is prepared:

| | Parts by volume |
|---|---|
| Ethylene dichloride | 100 |
| Amyl benzyl naphthalene | 10 |

Synthetic rubber prepared by copolymerizing in aqueous emulsion 55 parts of butadiene-1,3 and 45 parts of acrylonitrile is compounded in the conventional manner to form a stock exhibiting no tack. Calendered sheets of this stock are then brushed with the above tackifying solution, allowed to dry and pressed together. The solution imparted good tack to the surfaces and the tack persisted for some time after the treatment. When the stocks are pressed firmly together, they cannot be pulled apart without tearing the stock.

Equivalent results are obtained when acetone, methyl ethyl ketone, isopropyl chloride, a mixture of methyl ethyl ketone and ethylene dichloride and a mixture of ethylene dichloride and acetone are used as the solvent. Other benzyl-alkyl substituted naphthalene hydrocarbons also give satisfactory results.

The concentration of the alkyl-benzyl substituted naphthalene has an important effect upon the solution as a tackifier. When the naphthalene hydrocarbon is present in concentrations of between 5–10% by volume the best results are obtained. Some tackifying action is still observed when the concentration of the naphthalene hydrocarbon is as high as about 20% or even 30% by volume, but solutions containing as much as 50% by volume of the naphthalene hydrocarbon do not function as tackifiers when one coat is brushed upon the rubber in the conventional manner. Solutions as dilute as 2% or 3% may be employed, but in this case it is desirable to brush several coats of the solution on the rubber surface.

Although the synthetic rubber in the specific example was formed by the copolymerization in aqueous emulsion of 55 parts of butadiene-1,3 and 45 parts of acrylonitrile, copolymers formed from butadiene-1,3 and acrylonitrile in other proportions such as 65 butadiene-1,3 and 35 acrylonitrile or 75 butadiene-1,3 and 25 acrylonitrile may also be employed. Copolymers formed from other butadiene-1,3 hydrocarbons such as isoprene, 2-3 dimethyl butadiene-1,3 piperylene and the like and other alpha-methylene nitriles of the formula

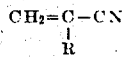

wherein R represents hydrogen or an alkyl group may also be used. Examples of such materials include rubber-like copolymers of butadiene-1,3 and alpha-methacrylonitrile, of isoprene and alpha ethacrylonitrile, of 2-3 dimethyl butadiene-1,3 and alpha methacrylonitrile, etc.

While I have herein disclosed specific examples of my invention, the invention is by no means limited thereto, for many modifications and variations are within the spirit and scope of the invention as defined in the appended claims.

I claim:

1. The method of imparting tack to an unvulcanized synthetic rubber prepared by copolymerizing a butadiene-1,3 hydrocarbon and an alpha-methylene nitrile, which comprises applying to the surface of the rubber a solution containing a volatile organic solvent and, dissolved therein, not over about 20% by volume of a naphthalene hydrocarbon containing at least one benzyl radical attached to a nuclear carbon atom in the naphthalene ring and at least one alkyl radical containing not more than 6 carbon atoms also attached to a nuclear carbon atom in the naphthalene ring, and allowing the solvent to evaporate.

2. The method of imparting tack to an unvulcanized synthetic rubber prepared by copolymerizing butadiene-1,3 and acrylonitrile which comprises applying to the surface of the rubber a solution containing a volatile organic solvent and, dissolved therein, not over about 20% by volume of a naphthalene hydrocarbon containing at least one benzyl radical attached to a nuclear carbon atom in the naphthalene ring and at least one alkyl radical containing not more than 6 carbon atoms also attached to a nuclear carbon atom in the naphthalene ring, and allowing the solvent to evaporate.

3. The method of claim 2 wherein the naphthalene hydrocarbon is a mixture of isomeric amyl benzyl naphthalenes.

4. The method of imparting tack to an unvulcanized synthetic rubber prepared by copolymerizing in aqueous emulsion butadiene-1,3 and acrylonitrile which comprises applying to the surface of the rubber a solution of an amyl benzyl naphthalene in a volatile organic solvent, the concentration of the naphthalene being between about 5 and 10% by volume, and allowing the solvent to evaporate.

DONALD V. SARBACH.